May 31, 1960  H. R. NACK  2,938,821
MANUFACTURE OF FLEXIBLE METAL-COATED GLASS FILAMENTS
Filed Feb. 18, 1955
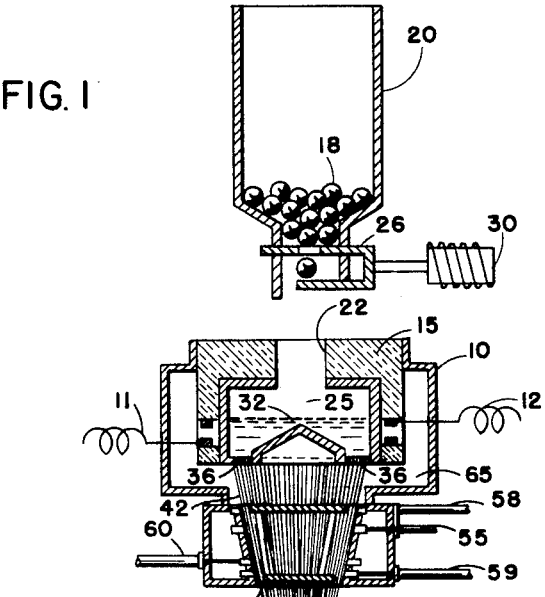
FIG. 1
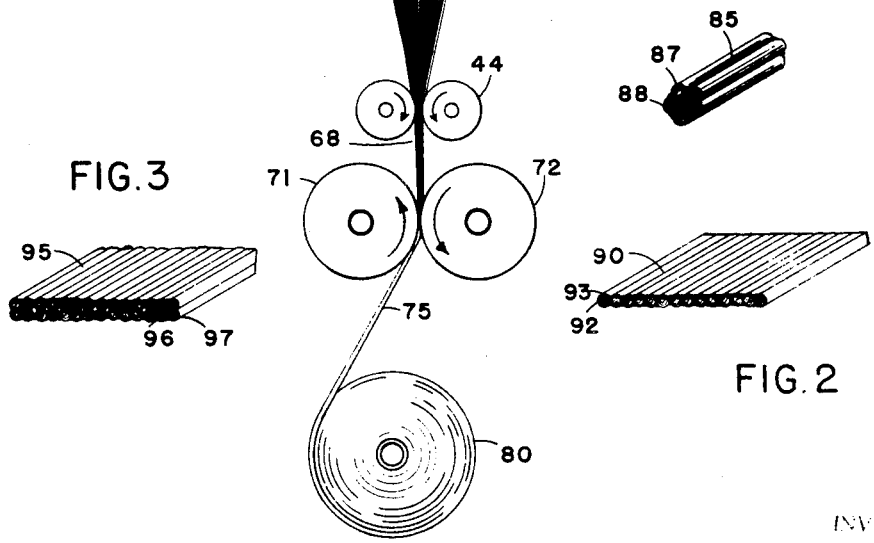
FIG. 3
FIG. 4
FIG. 2
INVENTOR
HERMAN R. NACK
BY
ATTORNEYS

United States Patent Office 2,938,821
Patented May 31, 1960

2,938,821
MANUFACTURE OF FLEXIBLE METAL-COATED GLASS FILAMENTS

Herman R. Nack, Columbus, Ohio, assignor, by mesne assignments, to Union Carbide Corporation, New York, N.Y., a corporation of New York Filed Feb. 18, 1955, Ser. No. 489,112

1 Claim. (Cl. 154—2.24)

This invention relates to cables and particularly to cables having definite resistance values per unit of length.

It is a primary object of this invention to provide a metal coated ceramic cable which is particularly suitable for high frequency electric current applications or the like.

It is an important object of this invention to provide a cable for the carrying of electric current and which cable may be employed to provide a definite resistance drop per unit of length.

Another object is to provide a compressed body made up of attenuated glass filaments coated with metal which is useful when a metallized ceramic material is desired.

Another object is to provide an article which is made of glass filaments gaseous metal coated and compressed together to form a substantially integral body.

It is a particular object of this invention to provide an electric current carrying cable having conductive elements composed of a glass core on which there is deposited metal, the deposition being effected by the thermal decomposition of a metal bearing gaseous compound.

It is yet another object of this invention to provide a readily producible cable for the carrying of an electric current in which the current carrying element may comprise a metal which is capable of being deposited on glass from the gaseous state, such as copper, nickel, aluminum, titanium, molybdenum and so forth.

It is also an object of this invention to provide a cable for the carrying of electric current having a plurality of current carrying members of varying electrical characteristics.

These and other objects of the invention are attained generally speaking by heating a glass filament to a temperature in the range of decomposition of a gaseous heat decomposable metal bearing compound, and contacting the filament with such a gaseous compound to effect deposition of the metal on the glass core. This metal sheathed core is then provided with an electrical insulating material such as asbestos paper, an insulating oil paper, glass fabric, an insulating varnish or rubber and may be employed in this form as a conductive element as in a coaxial cable. Also, however, each strand may form a single conductive element of a cable as in a ten-conductor cable and due to such construction makeup each of the elements may have differing metals surrounding the glass core resulting in differing resistances along the cable length. Further since the quantity of metal deposited about each glass core may be controlled as to thickness the conductivity even while employing the same metal may be altered for each of the conductive elements.

The size of the glass core is not critical and very fine filaments as well as larger core sizes may be readily employed. The degree of flexibility of the filaments will tend to decrease as the core size increases, however, and the core should be selected with a view to the ultimate use to be made of the cable. Thus with very large submarine cables flexibility is not as important a factor as it would be if the usage involved the ordinary lead-in wires which must be capable of considerable twisting. The appropriate core size for a particular installation may accordingly be readily selected.

The nature of the plating gas from which the metal is to be deposited upon the glass core is dependent primarily upon the metal or metals required for a particular cable. Thus the usual gaseous source of copper is copper acetylacetonate; nickel acetylacetonate or nickel carbonyl for nickel; molybdenum carbonyl or molybdenum chloride for molybdenum; chromium hexacarbonyl for chromium; zirconium iodide for zirconium; titanium bromide for titanium and iron carbonyl for iron.

With the refractory metals the decomposition temperatures of the gaseous compound is generally high and the glass utilized must have a softening point sufficiently high that no deterioration thereof sets in during the plating process. Also the glass should preferably be substantially alkali free, that is, have less than 1% $Na_2O$ in order to avoid deterioration of the metal during use. However, each of these factors is dependent upon the particular conditions under which the cable will operate and will be of greater or less importance as the service conditions vary. Thus a high alkali glass may itself be conductive under certain applied voltage conditions and should not be employed where such conditions will induce a deleterious reaction between the alkali of the glass and the metal.

The metal coated glass cores may individually be wound with electrical insulating tape, such as glass fabric and the separate elements may then be combined, if desired, into a multi-conductor cable. The combination or assembly of elements may then be further wound and bound into a compact unit with a fabric of electrical insulating material; also where required the cable may be suitably armored and then further wound with abrasive resistant fabric, this latter structure being particularly useful in undersea cables.

As glass filaments may be produced and plated in substantially unlimited lengths a full production reel may be readily made up without involving splicing of the components. In practice splicing may be readily effected by simply stripping back the cable and inserting the necessary length of metal over the filament and securing the spliced ends with insulating tape. The smaller sizes where the splice is lapped show no appreciable bulges or discontinuities; on larger core sizes where lapped splicing is undesirable the electrical characteristics of the cable are such that no appreciable distortion thereof will result by simply employing a short metal sleeve compressed over the ends of each of the metal coated filaments.

The invention will be more clearly understood by reference to the following detailed description and accompanying drawings wherein:

Figure 1 illustrates a suitable apparatus and method for producing metal coated glass filaments or strands which are pressure-clad to form a cable or band-like product in accordance with this invention;

Figure 2 is a perspective view illustrating a band or cable strip, partly in section, and formed by gaseous metal coating attenuated glass filaments or strands and pressing the strands together to form an integral, clad metal product;

Figure 3 is a like perspective view illustrating a similar clad metal product as in Figure 2, and which is fabricated of multiple layers of glass filaments or strands made in accordance with this invention;

Figure 4 is a like view as in Figure 3, and illustrating a cable which is of circular cross section and made up of pressure clad metalized glass filaments which is formed into a unitary cable.

Referring to the drawing more in detail, there is illustrated at 10 a furnace for melting glass to a molten state, and which furnace is electrically heated by the elements 11 and 12, the furnace being thermally insulated as at 15.

Glass in the form of solid balls 18 and stored in the hopper 20 above the furnace opening 22 is provided. Feeding of the glass balls 18 into the furnace chamber 25 is controlled by the slidable door 26 which is arranged in the bottom of the hopper 20. Operation of the sliding door 26 for feeding glass balls into the furnace is controlled by a solenoid operated valve 30. Molten glass 32 in the furnace chamber 25 is maintained at a substantially constant level and gravity fed outward therefrom through mold aperture openings 36, which apertures are provided in the bottom wall 40 of the furnace, as illustrated in the drawing.

Glass filaments or strands 42 are drawn from the furnace and attenuated by the rolls 44, and while thus heated and attenuated the strands are subjected to a gaseous metal coating by drawing the same through a chamber 50. The gaseous metal chamber 50 comprises a hermetically sealed chamber, diagrammatically illustrated in the drawing, and wherein the metal in the form of a gaseous compound such as carbonyl is admitted through the pipe line 55 to the plating chamber 50. At the same time carbon dioxide or other suitable inert gas is supplied through pipe lines 58 and 59. This inert gas functions as a carrier gas for admixing with the gaseous metal carbonyl and effecting its uniform distribution throughout the plating chamber 50. Waste gas is withdrawn through pipe line 60 under the influence of a vacuum or sub-atmospheric pressure conditions as may be supplied by a conventional vacuum pump (not shown).

The temperature in the plating chamber 50 is suitably controlled so as to bring about decomposition of the gaseous metal compound such as the carbonyl and deposition of the metal constituent on the glass filaments as the same are moved therethrough. The temperature of the glass fiber as drawn from the furnace is allowed to cool down sufficiently by passage of the same through an atmosphere or open air space, as illustrated at 65, and in this manner the residual heat of the glass filaments may be utilized to bring about decomposition of the gaseous metal compound to effect the metal plating of the glass filaments.

After passing the filaments which have been metal plated between the attenuating rolls 44, the metal coated strands 68 are passed between the pressure rolls 71 and 72. These pressure rolls are preferably rotated in opposite directions as illustrated by the arrows, and sufficient pressure applied to cause the metal coated strands to seize and form a unitary product, such as illustrated in Figures 2, 3 and 4. Roll 72 is rotated at a speed sufficiently greater than roll 71 in order to draw the material toward the roll 80. The pressure applied between the rolls will depend upon the metal plated on the glass filaments, but generally is effective utilizing about 2000 lbs. per square inch pressure. For soft metals, such as lead, tin, etc., the pressure by the rolls may be correspondingly reduced, but in any event the pressure applied is sufficient to produce a unitary metal product comprising gas plated metallized strands united together.

The pressure rolls for forming the clad metal strip 75 which may be rolled up on storage roll 80 may be formed in various cross sectional shapes, depending upon the particular product desired. For example, in forming a circular cable, such as illustrated at 85 in Figure 4, the peripheral surface of the rolls 71 and 72 will be semi-circular shaped so as to form a spherical pressure mold when the same are brought together and operated, as indicated in the drawing. In this manner a cable is formed comprising multiple strands of glass filaments 87, such as shown in Figure 4, and having a metal coating 88 and which are pressure molded together to form a unitary metal cable.

Similarly, as shown in Figure 2, by utilizing plane or flat surface pressure rollers a metal band or strip 90 may be produced, wherein the strand is made up of a single layer of glass metal filament or strands, such as shown at 92 in Figure 2, and wherein the metal coating 93 is made to weld or unite together so as to form a unitary band.

A like clad metal cable or band 95 may be formed, as shown in Figure 3, by applying multiple strands of glass filaments as at 96, and wherein the metal plate 97 on the strands are pressed together by the pressure rollers so as to form a unitary metal product.

By utilizing the present invention it is possible to produce various unitary metal shapes wherein the core of the strands or filaments are made of glass or the like ceramic material which has an outer coating of metal. Further, where it is desired to form the metal of twisted strands or filaments of glass, this may be accomplished by employing a conventional strand twisting means so as to produce a strand of glass wherein the same is made up of a number of twisted filaments similarly as in the making of thread and the like. Any size strand of thread may thus be built up and subjected to gaseous metal plating similarly as illustrated and described.

In the production of gaseous metal coated clad metal products in accordance with this invention, the band or cable may be formed of glass core or filaments coated with copper, by utilizing copper carbonyl as the gaseous metal compound in the plating chamber. Where it is desired to have the glass core coated with other metal, such as nickel, etc., then nickel carbonyl will be used as the gaseous metal compound. Similarly, other metals may be used to plate the glass filaments or cores, such as molybdenum, zirconium, chromium, titanium, iron, cobalt etc. The clad metal product may be made up of different colored strands of metal coated glass filaments or cores.

The clad metal bands or cables may, in accordance with this invention, be utilized in various arts and particularly as electrical conductors being suitable for use in high frequencies. The glass core is formed of attenuated glass filaments which have been hot drawn to produce a core which has substantially greater tensile strength than would otherwise be the case and accordingly a higher strength cable or band formed of the metal coated strands is produced. The metal coating being put on by gaseous metal deposition is uniformly distributed over the surface of the strands and when the same are pressure abraded together, even at room temperatures, the strands of metal coated glass filaments may be made to cold weld and form a unitary structure. The product is flexible and has high tensile strength. This apparently is due to the increased tensile strength effected by virtue of the heat treatment and attenuation of the glass filaments prior to metal coating the same.

It will be understood that this invention is susceptible to modifications in order to adapt the apparatus and method for different conditions and uses as desired, the same being intended to be included, and more particularly pointed out in the appended claim.

This application is a continuation-in-part of my prior application, Serial Number 299,861, filed July 19, 1952.

What is claimed is:

A method of making a pressure clad-metal cable consisting of establishing a molten mass of glass, withdrawing filaments of glass from said molten mass, attenuating said filaments, subjecting said filaments as drawn to gas plating by contacting the filaments while heated with a thermally decomposable metal bearing compound which is decomposed at the temperature of the glass filament to deposit the metal constituent on said filaments to provide elongated metallized glass filaments, gathering together a plurality of said metallized glass filaments and arranged substantially parallel to the longitudinal axis of the cable, and pressure roll cladding the contiguous metallized glass fibers together by the application of sufficient pressure thereto at room temperature to cold-weld said metallized filaments into a unitary clad-metal cable structure which has high tensile strength and is flexible.

References Cited in the file of this patent

UNITED STATES PATENTS

| | | |
|---|---|---|
| 2,018,343 | Bienfait et al. | Oct. 22, 1935 |
| 2,269,839 | Young | Jan. 13, 1942 |
| 2,616,165 | Brennan | Nov. 4, 1952 |
| 2,699,415 | Nachtman | Jan. 11, 1955 |
| 2,749,255 | Nack et al. | June 5, 1956 |
| 2,772,987 | Whitehurst et al. | Dec. 4, 1956 |

FOREIGN PATENTS

| | | |
|---|---|---|
| 573,002 | Great Britain | Nov. 1, 1945 |

OTHER REFERENCES

Steel (publication), vol. 113, No. 16, 1953, pages 120, 121, 124.